(12) United States Patent
Havre et al.

(10) Patent No.: US 6,466,211 B1
(45) Date of Patent: Oct. 15, 2002

(54) DATA VISUALIZATION APPARATUSES, COMPUTER-READABLE MEDIUMS, COMPUTER DATA SIGNALS EMBODIED IN A TRANSMISSION MEDIUM, DATA VISUALIZATION METHODS, AND DIGITAL COMPUTER DATA VISUALIZATION METHODS

(75) Inventors: Susan L. Havre, Richland; Elizabeth G. Hetzler, Kennewick; Lucy T. Nowell; Paul D. Whitney, both of Richland, all of WA (US); Feng Gao, Old Lyme, CT (US); James J. Thomas; Louis M. Martucci, both of Richland, WA (US); W. Michelle Harris, Alexandria, VA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/426,811

(22) Filed: Oct. 22, 1999

(51) Int. Cl.[7] .............................................. G06F 17/30
(52) U.S. Cl. .................... 345/440; 345/440.1; 345/630; 345/632; 382/177; 704/9; 704/104.1
(58) Field of Search .................... 345/440, 441, 345/442, 443, 433, 764, 854, 803, 804; 346/619, 630, 632, 440.1, 440.2; 704/104.1, 9; 707/7, 100, 6, 2, 3, 10, 522; 382/177, 292; G06F 17/30

(56) References Cited

U.S. PATENT DOCUMENTS

| | | | |
|---|---|---|---|
| 5,295,243 A | 3/1994 | Robertson et al. | |
| 5,333,254 A | 7/1994 | Roberston | |
| 5,339,390 A | 8/1994 | Roberston et al. | |

(List continued on next page.)

FOREIGN PATENT DOCUMENTS

EP      0 640 907 A2    8/1994

OTHER PUBLICATIONS

International Search Report; PCT/US 00/28746; Battelle Memorial Institute; Mar. 23, 2001; 3 pps.
"Multi–faceted Insight Through Interoperable Visual Information Analysis Paradigms"; Hetzler, et al.; 1998; pps. 137–144.
R.R. Singers, Johnson Controls, Inc.; "Metaphoric Abstraction: The River of Time and Complex Systems", pp. 1–8 (1998).
R.R. Singers, L.S. Enders; Johnson Controls, Inc.; "Metaphoric Abstraction: The Starfield and Complex Systems", pp. 34–46 (Sep., 1994).
Alfred Inselberg, *Multidimensional Detective*, pp. 100–107 (1997).
Grace Wahba, *Spline Models for Observational Data*, ch. 1, pp. 1–20 (SIAM 1990).
W. Keith Edwards and Elizabeth D. Mynatt, Timewarp: Techniques for Autonomous Collaboration. In *Proceedings of CHI '97*, pp. 218–225 (1997).

(List continued on next page.)

Primary Examiner—Matthew Luu
Assistant Examiner—Wesner Sajous
(74) Attorney, Agent, or Firm—Wells St. John, P.S.

(57) ABSTRACT

Data visualization apparatuses, computer-readable mediums, computer data signals embodied in a transmission medium, data visualization methods, and digital computer data visualization methods are provided. According to one aspect of the present invention, a data visualization apparatus includes an image device configured to provide a visual image; and digital processing circuitry coupled with the image device and configured to access data including a plurality of themes, to generate a thematic illustration corresponding to the themes and having a plurality of outer contour lines which are spaced at varying distances relative to a reference line, and to control the image device to depict the thematic illustration.

101 Claims, 9 Drawing Sheets

U.S. PATENT DOCUMENTS

| | | | |
|---|---|---|---|
| 5,485,564 A * | 1/1996 | Miura ........................ 395/140 |
| 5,515,488 A | 5/1996 | Hoppe et al. |
| 5,528,735 A | 6/1996 | Strasnich et al. |
| 5,546,516 A | 8/1996 | Austel et al. |
| 5,546,529 A | 8/1996 | Bowers et al. |
| 5,555,354 A | 9/1996 | Strasnick et al. |
| 5,564,048 A | 10/1996 | Eick et al. |
| 5,619,709 A | 4/1997 | Caid et al. |
| 5,621,874 A | 4/1997 | Lucas et al. |
| 5,631,982 A | 5/1997 | Inselberg et al. |
| 5,632,009 A | 5/1997 | Rao et al. |
| 5,636,350 A | 6/1997 | Eick et al. |
| 5,671,381 A | 9/1997 | Strasnick et al. |
| 5,717,847 A | 2/1998 | Schulmeiss |
| 5,786,820 A | 7/1998 | Robertson |
| 5,787,422 A | 7/1998 | Tukey et al. |
| 5,794,178 A * | 8/1998 | Caid ............................. 704/9 |
| 5,835,905 A | 11/1998 | Pirolli et al. |
| 5,844,572 A * | 12/1998 | Schott ........................ 345/440 |
| 5,847,709 A | 12/1998 | Card et al. |
| 5,848,191 A * | 12/1998 | Chen et al. ................. 382/229 |
| 5,850,476 A * | 12/1998 | Chen et al. ................. 382/177 |
| 5,880,742 A | 3/1999 | Rao et al. |
| 5,883,635 A | 3/1999 | Rao et al. |
| 5,912,674 A | 6/1999 | Magarshak |
| 5,917,500 A * | 6/1999 | Johnson ...................... 345/440 |
| 5,920,313 A | 7/1999 | Diedrichsen et al. |
| 5,940,821 A * | 8/1999 | Wical ............................. 707/3 |
| 5,960,381 A | 9/1999 | Singers et al. |
| 5,973,662 A | 10/1999 | Singers et al. |
| 6,038,561 A * | 3/2000 | Snyder .......................... 707/6 |
| 6,286,005 B1 * | 9/2001 | Cannon ...................... 707/100 |
| 6,307,573 B1 * | 10/2001 | Barros ........................ 345/764 |
| 6,364,362 B1 * | 4/2002 | Severin ........................ 283/17 |

OTHER PUBLICATIONS

Gerald M. Karam, Visualization Using Timelines. *In Proceedings of the 1994 International Symposium on Software Testing and Analysis*, pp. 125–137 (1994).

Robin L. Kullberg, Dynamic Timelines: Visualizing the History of Photography. In *Proceedings of CHI '96*, pp. 386–387 (1996).

Wendy E. Mackay and Michael Beaudouin–Lafon, DIVA: Exploratory Data Analysis with Multimedia Streams, In *Proceedings of CHI '98*, pp. 416–423 (1998).

Lucy Terry Nowell et al., Visualizing Search Results: Some Alternatives to Query–Document Similarity, In *Proceedings of SIGIR '96*, Aurich: ACM Press (Aug. 1996), pp. 67–75.

Catherine Plaisant et al., Visualizing Medical Records with LifeLines, *In Chi '98 SUmmary*, pp. 28–29 (1998).

E. R. Tufte, Visual Explanations: Images and Quantities Evidence and Narrative, Cheshire, CT: Graphics Press (1997, pp. 90–91, 121.

James A. Wise et al., Visualizing the Non–Visual: Spatial analysis and interaction with information from text documents. In S.K. Card, Readings in Information Visualization: Using Vision to Think, San Francisco: Morgan Kaufman (1999) pp. 442–450.

U.S. patent application Ser. No. 08/695,455, filed Aug. 12, 1996, entitled: "Three–Dimensional Display of Document Set".

U.S. patent application Ser. No. 08/713,313, filed Sep. 13, 1996, entitled: System for Information Discovery.

* cited by examiner

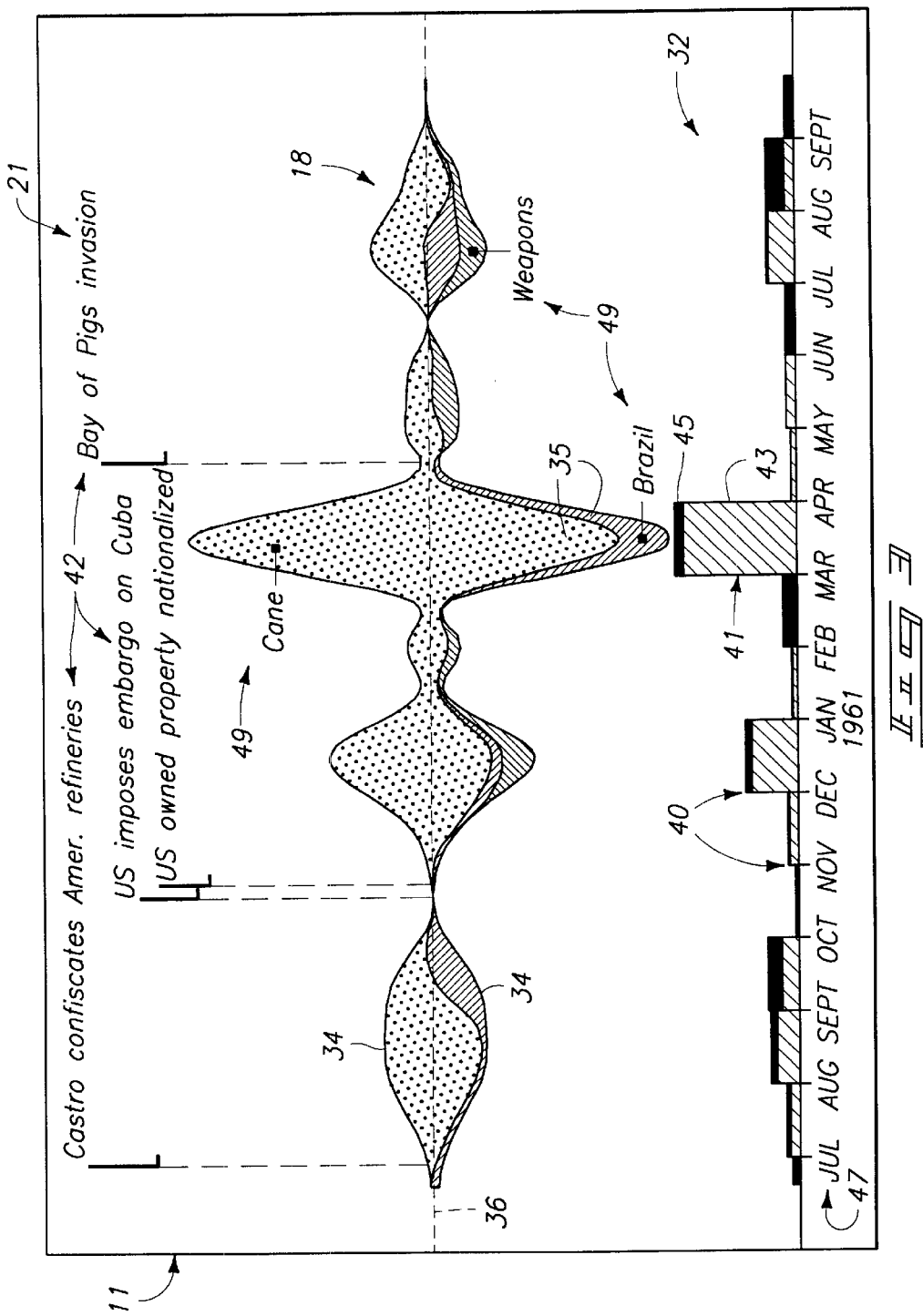

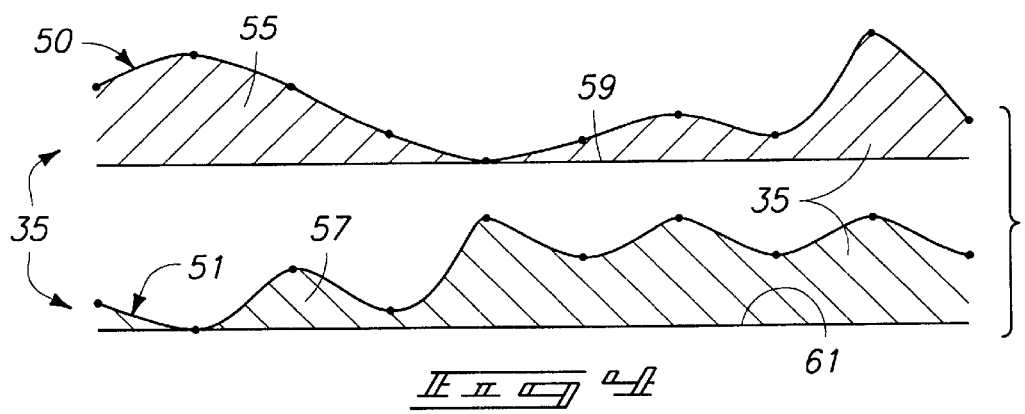
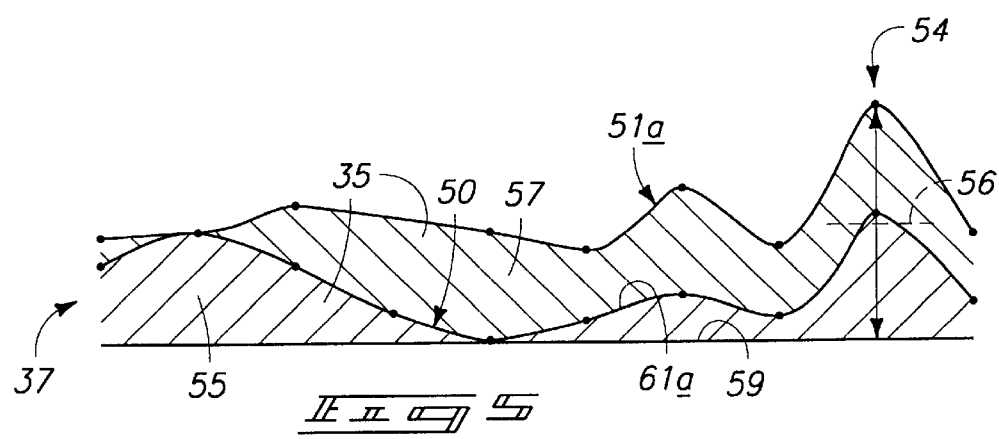
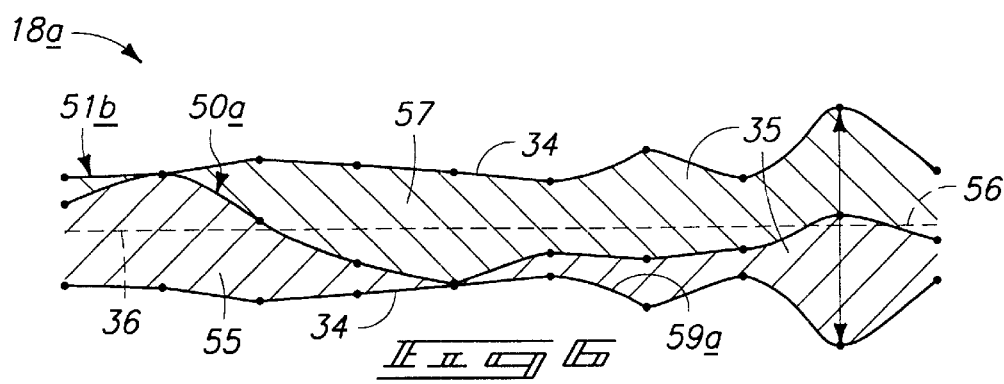

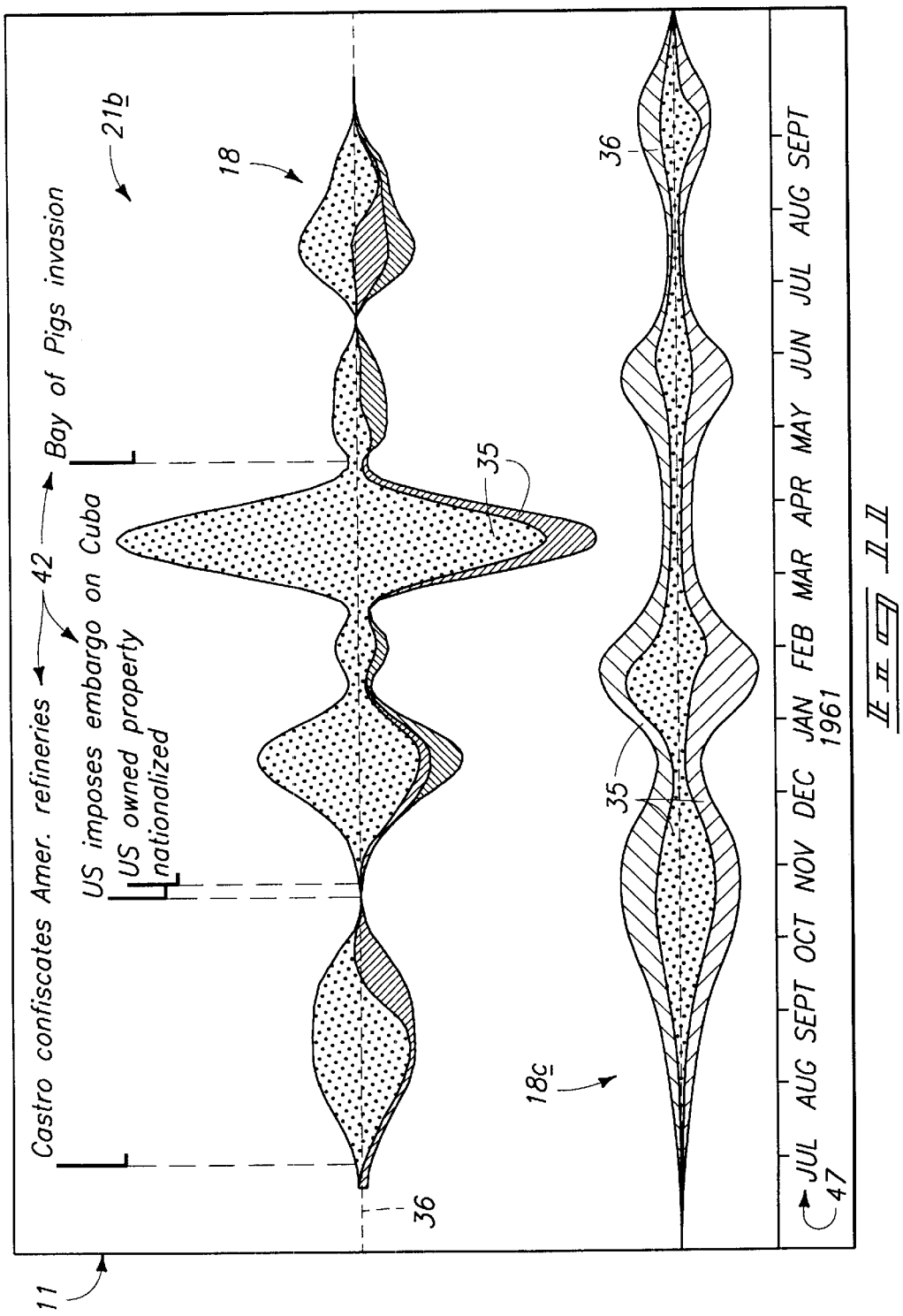

DATA VISUALIZATION APPARATUSES, COMPUTER-READABLE MEDIUMS, COMPUTER DATA SIGNALS EMBODIED IN A TRANSMISSION MEDIUM, DATA VISUALIZATION METHODS, AND DIGITAL COMPUTER DATA VISUALIZATION METHODS

TECHNICAL FIELD

The present invention relates to data visualization apparatuses, computer-readable mediums, computer data signals embodied in a transmission medium, data visualization methods, and digital computer data visualization methods.

BACKGROUND OF THE INVENTION

Some conventional information visualization systems provide visualization of documents or their attributes by representing documents or a group of documents with graphical symbols. Changes over a sequential variable such as time are often represented by showing a changing image which depicts data within pertinent time slots.

One graphical software application is available from Microsoft Corporation under the designation Excel™. Excel enables a user to generate a stacked line graph to visually represent a data set. The lines utilized to represent graphical information are stacked relative to one another and to corresponding x and y axes.

The stacked line graph includes a plurality of lines corresponding to respective entities being graphed. Although cumulative widths of the entities are depicted with reference to one of the axes, it is often difficult and tedious to determine the relative weights of entities with respect to one another at any given reference point.

Computer systems utilizing conventional data visualization technology are currently applied to numerous disciplines. For example, such is utilized for educational purposes, corporate presentations, etc. Accordingly, there is a need to provide visualization systems which provide clear and concise representations of desired data inasmuch as computers are being utilized at an ever increasing pace for data visualization.

BRIEF DESCRIPTION OF THE DRAWINGS

Preferred embodiments of the invention are described below with reference to the following accompanying drawings.

FIG. 3 is a graphical representation of an exemplary thematic illustration and bar chart depicted using the digital computer.

FIG. 4 is a graphical representation of plural thematic components of a thematic illustration.

FIG. 5 is a graphical representation of the thematic components of FIG. 4 stacked upon one another.

FIG. 6 is a graphical representation of stacked and centered thematic components.

FIG. 11 is a graphical representation depicting plural exemplary thematic illustrations.

DETAILED DESCRIPTION OF THE PREFERRED EMBODIMENTS

Figure 1:
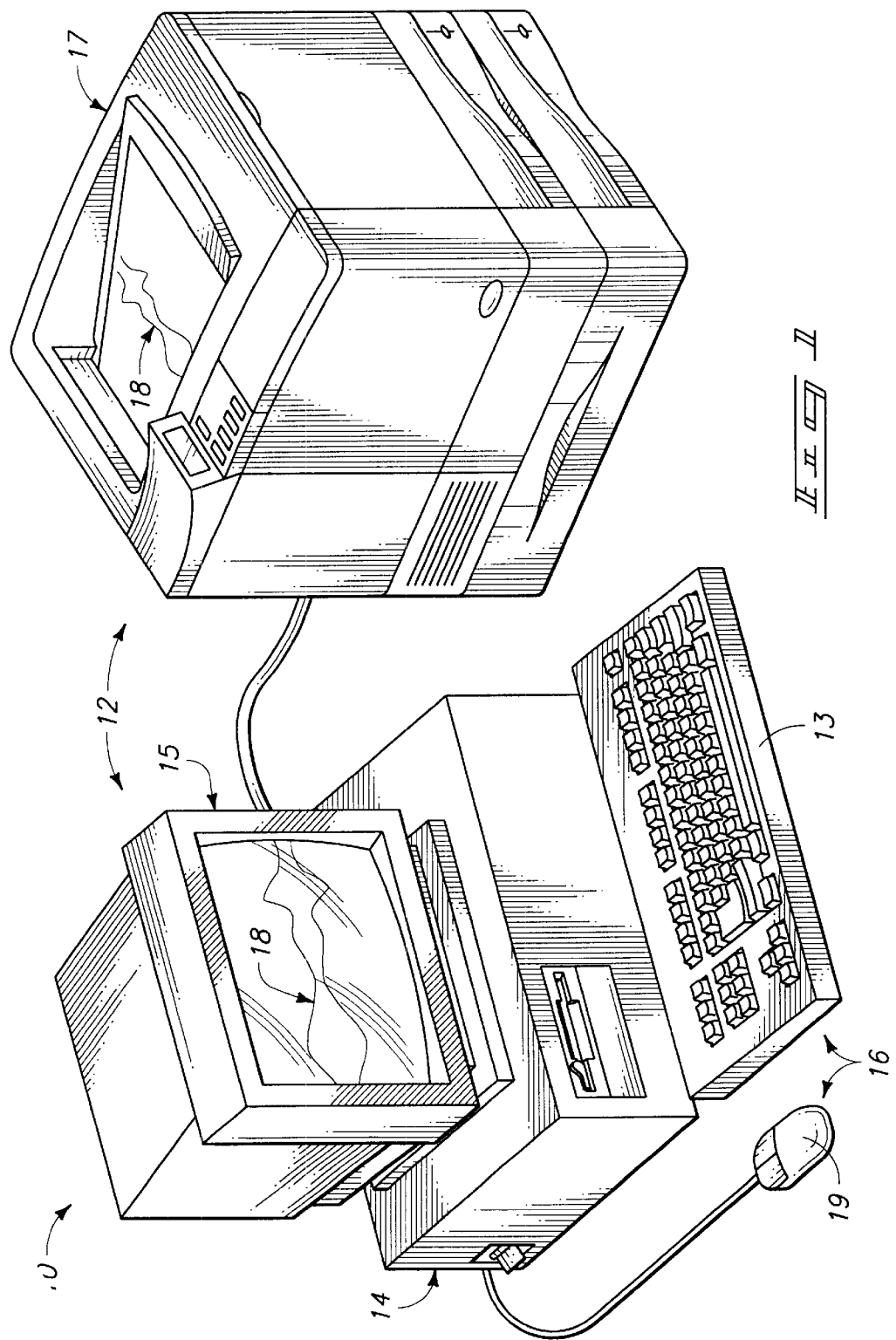
FIG. 1 is a perspective view of an exemplary data visualization apparatus comprising a digital computer.

This disclosure of the invention is submitted in furtherance of the constitutional purposes of the U.S. Patent Laws "to promote the progress of science and useful arts" (Article 1, Section 8).

According to one aspect of the present invention, a data visualization apparatus comprises: an image device configured to provide a visual image; and digital processing circuitry coupled with the image device and configured to access data including a plurality of themes, to generate a thematic illustration corresponding to the themes and having a plurality of outer contour lines which are spaced at varying distances relative to a reference line, and to control the image device to depict the thematic illustration.

A second aspect of the present provides a computer-readable medium comprising: computer usable code configured to cause digital processing circuitry to access data comprising a plurality of themes; computer usable code configured to cause digital processing circuitry to generate a thematic illustration having a plurality of outer contour lines spaced at varying distances relative to a reference line and a plurality of thematic components intermediate the outer contour lines which individually correspond to a respective one of the themes; and computer usable code configured to cause digital processing circuitry to control an image device to depict the thematic illustration.

Another aspect of the invention provides a computer data signal embodied in a transmission medium comprising: computer usable code configured to cause digital processing circuitry to access data comprising a plurality of themes; computer usable code configured to cause digital processing circuitry to generate a thematic illustration having a plurality of outer contour lines spaced at varying distances relative to a reference line and a plurality of thematic components intermediate the outer contour lines which individually correspond to a respective one of the themes; and computer usable code configured to cause digital processing circuitry to control an image device to depict the thematic illustration.

A data visualization method according to an aspect of the present invention provides: accessing data including a plurality of themes; and depicting a thematic illustration with respect to a reference line and corresponding to the themes and having a plurality of outer contour lines which define the thematic illustration and are individually spaced at varying distances relative to the reference line.

Another aspect of the invention provides a digital computer data visualization method comprising: accessing the data including a plurality of themes using digital processing circuitry; generating a thematic illustration using the digital processing circuitry having a plurality of outer contour lines spaced at varying distances relative to a reference line and a plurality of thematic components intermediate the outer contour lines which individually correspond to a respective one of the themes; and depicting the thematic illustration.

Yet another aspect of the present invention provides a digital computer data visualization method comprising:

accessing a plurality of references and theme data including a plurality of themes and a plurality of thematic strengths corresponding to the themes using digital processing circuitry; generating a thematic illustration with respect to the references using the digital processing circuitry, the generating comprising: generating a plurality of thematic components individually corresponding to respective ones of the themes and having widths individually corresponding to respective ones of the thematic strengths; stacking the thematic components; centering a reference line relative to a portion of the theme illustration having the greatest cumulative thematic strengths of the thematic components; and orientating the thematic components relative to the reference line; controlling an image device to depict the thematic illustration using the digital processing circuitry; generating a bar chart relative to the reference line corresponding to respective thematic strengths of the themes using the digital processing circuitry; controlling the image device to visually depict the bar chart using the digital processing circuitry; and controlling the image device to visually depict a plurality of identifiers relative to the thematic illustration to identify the references and the themes using the digital processing circuitry.

Referring to FIG. 1, a data visualization apparatus 10 according to one aspect of the present invention is illustrated. The depicted data visualization apparatus 10 is implemented as a digital computer such as an Ultra 10 elite 3D workstation available from Sun Microsystems, Inc., with SunOS Release 5.6 and OpenWindows (Version 3.6) in one exemplary embodiment. Other additional exemplary software utilized includes Rogue Wave Software Object-Oriented Libraries including Tools.h++ (Version 7), Math.h++ (Version 6), LAPACK.h++ (Version 2), and Analytics.h++ (Version 1) and software interface to graphics hardware OpenGL™ available from Silicon Graphics, Inc. The depicted data visualization apparatus 10 is configured to operate under a UNIX™ operating system. Other configurations of data visualization apparatus 10 are provided in other embodiments.

As shown, data visualization apparatus 10 includes a plurality of image devices 12, a housing 14 and a user interface 16. Image devices 12 are individually configured to visually depict data such as a thematic illustration 18 described in detail below. Exemplary image devices 12 comprise a monitor 15 and a printer 17. Image devices 12 comprise other devices configured to depict data in other embodiments. Exemplary devices of user interface 16 include a keyboard 13 and a mouse 19 as shown.

Figure 2:
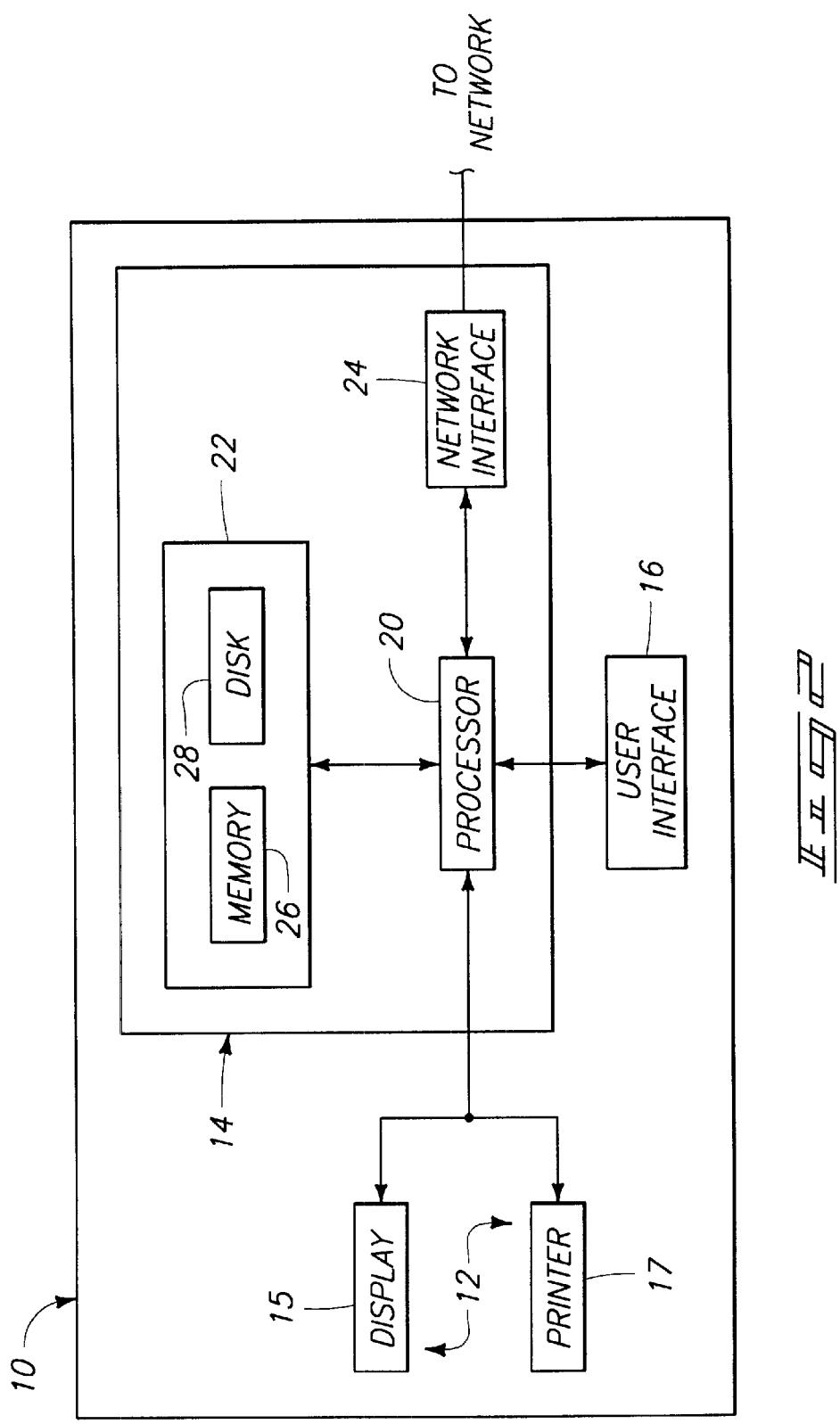
FIG. 2 is a functional block diagram of exemplary components of the digital computer of FIG. 1.

Referring to FIG. 2, additional components of an exemplary data visualization apparatus 10 comprising a digital computer are illustrated. In particular, housing 14 is configured to house a processor 20, a plurality of storage devices 22, and a network interface 24. In the illustrated configuration, storage devices 22 include memory 26 and disk storage device 28. Storage devices 22 comprise computer usable media configured to store computer usable code and data. Exemplary memory 26 includes random access memory (RAM) and read only memory (ROM). Exemplary disk storage devices 28 include floppy disks and hard disks. Other storage devices such as a CD-ROM device are utilized in other configurations.

An exemplary network interface 24 comprises a network interface card (NIC) configured to couple with an external network such as a public switched telephone network (PSTN), a packet switched network, such as the Internet, etc.

Data visualization apparatus 10 is configured to access data and visually depict such information in thematic illustration 18 (FIG. 3) with respect to a plurality of references (e.g., increasing time) and/or events using image devices 12 in the described embodiment. In the depicted configuration, thematic illustration 18 portrays multiple streams of information in relation to a common sequence, such as time.

Processor 20 comprising digital processing circuitry is coupled with image devices 12 and is configured to access data from storage devices 22, network interface 24, and user interface 16. Processor 20 is configured to generate thematic illustration 18 corresponding to themes, references and/or events within the accessed data as described in detail below. Processor 20 further controls image devices 12 to depict thematic illustration 18 corresponding to the accessed data.

Referring to FIG. 3, an exemplary visual representation 21 corresponding to exemplary data is shown upon media 11 of an appropriate image device 12. Media 11 is suitable to visually depict visual representation 21 and in exemplary configurations comprises paper a printer image device 17, a display screen of a monitor image device 15, etc. Other types of media 11 are used in other embodiments.

The depicted data corresponds to the occurrence of particular words (e.g., Brazil, cane, etc.) within data, such as a collection of speeches by Fidel Castro over a given period of time, for example. Any type of data may be depicted within visual representation 21 including thematic illustration 18.

As shown, the depicted exemplary visual representation 21 of image device 12 includes thematic illustration 18 and a bar chart 32. The depicted thematic illustration 18 is in the form of a river metaphor while bar chart 32 is provided as a histogram according to one embodiment. Thematic illustration 18 represents the ebb and flow of themes within data in relation to influencing or unrelated events. According to certain aspects, thematic illustration 18 shows changes with respect to references (e.g., changes over time) and events. In particular, events which may influence the themes may be emphasized.

Data to be displayed within visual representation 21 includes numerous types of data in the described embodiment. In the example described herein, accessed data for visualization by apparatus 10 includes themes, thematic strengths of the respective themes, references, events and identifiers.

More specifically, data accessed by processor 20 in the described example includes themes comprising words utilized in speeches by Fidel Castro. The accessed data further includes reference information and event information which may relate to the themes in some manner. The references comprise monthly time periods in the illustrated visual representation 21.

As described below, visual representation 21 generated by data visualization apparatus 10 depicts thematic strengths of the themes with respect to the references. Data accessed by apparatus 10 includes a plurality of themes, reference information including the interval of the references (e.g., day, month, year, etc.), identification of a first reference (e.g., July, 1960), and thematic strength information of respective themes corresponding to the references. In the described embodiment, thematic strength indicates the number of occurrences of a theme corresponding to a given reference (e.g., the number of occurrences of words within documents over a given period of time).

In one configuration, the accessed data is provided within a table format including rows corresponding to thematic strengths for a given reference and columns including the thematic strengths of a given theme across some or all of the references. Such accessed data is provided within ASCII text files in an exemplary configuration.

According to certain aspects, processor 20 is configured to control at least one of image devices 12 to depict thematic illustration 18 including a plurality of outer contour lines 34 which define the shape of thematic illustration 18. One or more thematic component 35 is provided intermediate outer contour lines 34 to represent the thematic strengths of respective themes.

Further, a plurality of references 40 are also depicted. As shown, references 40 are sequentially illustrated from left to right. Such references 40 correspond reference information to the thematic strengths of respective thematic components 35 illustrated in thematic illustration 18. In the depicted embodiment, references 40 define periods of time indicated by monthly increments. Other reference events are utilized in other visual representations 21.

Processor 20 controls image device 12 to arrange thematic illustration 18 relative to a reference line 36. In the depicted illustration, reference line 36 comprises a straight line relative to thematic illustration 18. Reference line 36 extends in a direction substantially parallel to the flow of thematic illustration 18 relative to references 40. The depicted thematic illustration 18 is arranged about the depicted reference line 36 comprising a center line in the depicted embodiment. More specifically, outer contour lines 34 are symmetrical about reference line 36 comprising a center line in the depicted thematic illustration 18. Reference line 36 may be provided at other locations relative to thematic illustration 18 in other arrangements. Further, reference line 36 may be depicted or not shown at all in particular configurations of visual representation 21.

Processor 20 is configured to define outer contour lines 34 corresponding to cumulative thematic strengths of respective themes. Processor 20 controls image device 12 to depict thematic components 35 of thematic illustration 18 intermediate outer contour lines 34 and individually corresponding to a respective theme. Thematic components 35 comprise curves in the described embodiment and correspond to currents in relation to the river metaphor.

Outer contour lines 34 are spaced at varying distances relative to reference line 36 as shown in FIG. 3 corresponding to cumulative thematic strengths of thematic components 35. As explained in detail below, the thematic strengths of themes are depicted by the widths of respective thematic components 35 in the arrangement described herein. For example, according to some aspects of the present invention, thematic components 35 having increased widths represent stronger thematic strengths compared to thematic components 35 of narrower widths. Such thematic strength information is also shown with respect to a plurality of references 40 (e.g., the widths of thematic components 35 represent thematic strengths at respective months as shown). Referring to the depicted thematic illustration 18, the theme strength of the theme "cane" during the March 1961 reference is much stronger than the thematic strength of theme "Brazil" during the same reference period.

As shown, processor 20 in the described embodiment controls image device 12 to depict thematic components 35 individually contacting adjacent thematic components. In particular, processor 20 controls image device 12 to depict thematic illustration 18 comprising a solid illustration of thematic components 35 in the illustrated example. In certain aspects, processor 20 is configured to control image device 12 to depict thematic components 35 comprising a plurality of different respective colors as shown in FIG. 3 to aid the viewer with following a given theme at respective references 40 throughout thematic illustration 18.

Referring to bar chart 32, information pertaining to cumulative thematic strengths of themes at individual references 40 is shown. A plurality of bars 41 are depicted corresponding to respective references 40. Individual bars 41 include a first portion 43 and a second portion 45.

In the depicted embodiment, first portion 43 corresponds to the cumulative theme strengths of all themes represented in thematic illustration 18 for an associated reference 40. Second portion 45 corresponds to the cumulative theme strengths of themes not represented in thematic illustration 18 but present within the data for an associated reference 40. Other information may be conveyed within bar chart 32 according to other aspects of the invention.

Processor 20 provides a plurality of identifiers according to some aspects of the present invention. Exemplary identifiers include reference labels 47 (e.g., month and year designations in the depicted illustration), thematic labels 49 (e.g., terms used in documents such as cane, etc.), and event labels 42 corresponding to other facts relevant or irrelevant to reference labels 47 and thematic illustration 18 (e.g., Bay of Pigs invasion). Visual representation 21 of the present invention is interactive and enables a user via user interface 16 to instruct processor 20 to selectively display or hide identifiers, extend grid lines, etc.

Referring now to FIG. 4–FIG. 6, an illustrative representation of an exemplary method of constructing a thematic illustration in accordance with aspects of the present invention is shown. Other methods are utilized in accordance with other embodiments.

Referring initially to FIG. 4, plural curves are labelled with references 50, 51. Processor 20 is configured to determine or calculate curves 50, 51 using the accessed data. Curves 50, 51 correspond to respective themes and depict thematic strengths of the themes relative to references. Areas 55, 57 bounded by curves 50, 51 and their respective baselines 59, 61 correspond to respective themes and depict thematic strengths.

One exemplary technique for determining curves 50, 51 is described in *Spline Models For Observational Data,* Grace Wahba, SIAM 1990, incorporated herein by reference. For example, the curves are determined based on the input data (e.g., a plurality of points for each curve). The curves drawn are constrained so that the curves traverse between abscissa corresponding with successive ordinate values. The standard interpolating splines described in Chapter 1 of Wahba 1990 sometimes traverse outside such bounds. To ensure the constraint, the data is augmented so that, for local extreme values of the abscissa, the corresponding ordinate values have zero-derivative data added to the original data set. The calculation of curves can proceed as described in Chapter 1 of Wahba 1990. If the curves based on the augmented data still traverse outside the bounding abscissa values between successive ordinate values, then the curve can be replaced by a linear interpolant for that segment. Other techniques for determining curves are utilized in other embodiments.

Although only two theme curves 50, 51 are depicted in FIG. 4 corresponding to two themes (i.e., thematic components 35) being displayed in an exemplary thematic illustration 18, more or less theme components 35 may be depicted in a given theme illustration 18.

Referring to FIG. 5, it is desired according to some aspects of the invention to determine a center reference of a thematic illustration to be depicted. More specifically, the thematic illustration is depicted relative to a center of a portion of the thematic illustration having the greatest cumulative thematic strengths of the thematic components.

For example, referring to a composite thematic representation 37 shown in FIG. 5 and including thematic components 35, a greatest thematic strength is illustrated at peak 54. Baseline 61a corresponding to area 57 is formed to curve 50 to provide the illustrated composite thematic representation 37. Curve 51 is slightly deformed to the depicted shape of curve 51a. A midpoint 56 of the greatest composite thematic strength peak 54 of composite thematic representation 37 is utilized to center the corresponding thematic illustration to be displayed. Such centering may be utilized to assure proper display of the thematic illustration within an appropriate image device 12. For example, a center line (e.g., reference line 36 of FIG. 6) of the thematic illustration is arranged to pass through midpoint 56 according to some aspects of the invention.

Composite thematic representation 37 conveniently illustrates determination of the center reference. In practice, processor 20 may be configured to analyze total thematic strengths for respective segments (e.g., references) without use of composite thematic representation 37.

Referring to FIG. 6, thematic illustration 18a formed from thematic components 35 of FIG. 4 and associated areas 55, 57 is shown. Curve 51a has been deformed to provide curve 51b and baseline 59 provides baseline curve 59a. Curves 51b and 59a form outer contour lines 34. Curve 50 is deformed to curve 50a in FIG. 6.

Processor 20 orients thematic illustration 18a with respect to midpoint 56 in the described embodiment. In particular, segments of thematic illustration 18a of FIG. 5 are centered about midpoint 56. In one aspect, segments of thematic illustration 18a are defined corresponding to the references. Alternatively, segments of other sizes may be utilized if desired (e.g., to improve the resolution of the thematic illustration). Processor 20 offsets individual segments of thematic illustration 18a to center such segments with respect to the center of thematic illustration 18a corresponding to midpoint 56.

More specifically, once the center of thematic illustration 18a is known, offsets of individual segments of thematic illustration 18a are determined. For example, the total thematic strength of an individual segment is determined. A negative offset is one-half of the total segment thematic strength. A lower boundary (corresponding to lower outer contour line 34) is determined by starting at the center position corresponding to midpoint 56 (aligning the center of the segment with the determined center from above) and subtracting one-half the total thematic strength for the segment. Such provides the lower boundary for the particular segment and corresponding to lower outer contour line 34. Thereafter, the lowermost thematic component 35 is stacked upon the lower outer contour line 34. Subsequently, the remaining thematic components 35 are stacked upwardly until the uppermost boundary line (corresponding to uppermost outer contour line 34) is provided. The above is repeated for the remaining segments to form thematic illustration 18a.

In one example (not shown), assume a center reference corresponding to midpoint 56 is determined to be 1.5 units from a horizontal axis. A given segment includes four thematic components 35 which have a cumulative thematic strength of one unit (e.g., individual thematic components 35 have respective thematic strengths of one quarter units). The offset for the segment would be one-half unit. Thus, the lower boundary outer contour line 34 would be offset from the center by one-half unit or at a position of one unit relative to the horizontal axis. The lowermost thematic component 35 is provided at the lowermost outer contour line 34. Thereafter, the remaining thematic components 35 are stacked upon the lowermost thematic component 35 and have individual respective lower boundaries of 1.25 units, 1.5 units, and 1.75 units. In fact, an upper boundary of one thematic component 35 defines a lower boundary of the above-adjacent thematic component 35.

Figure 7:
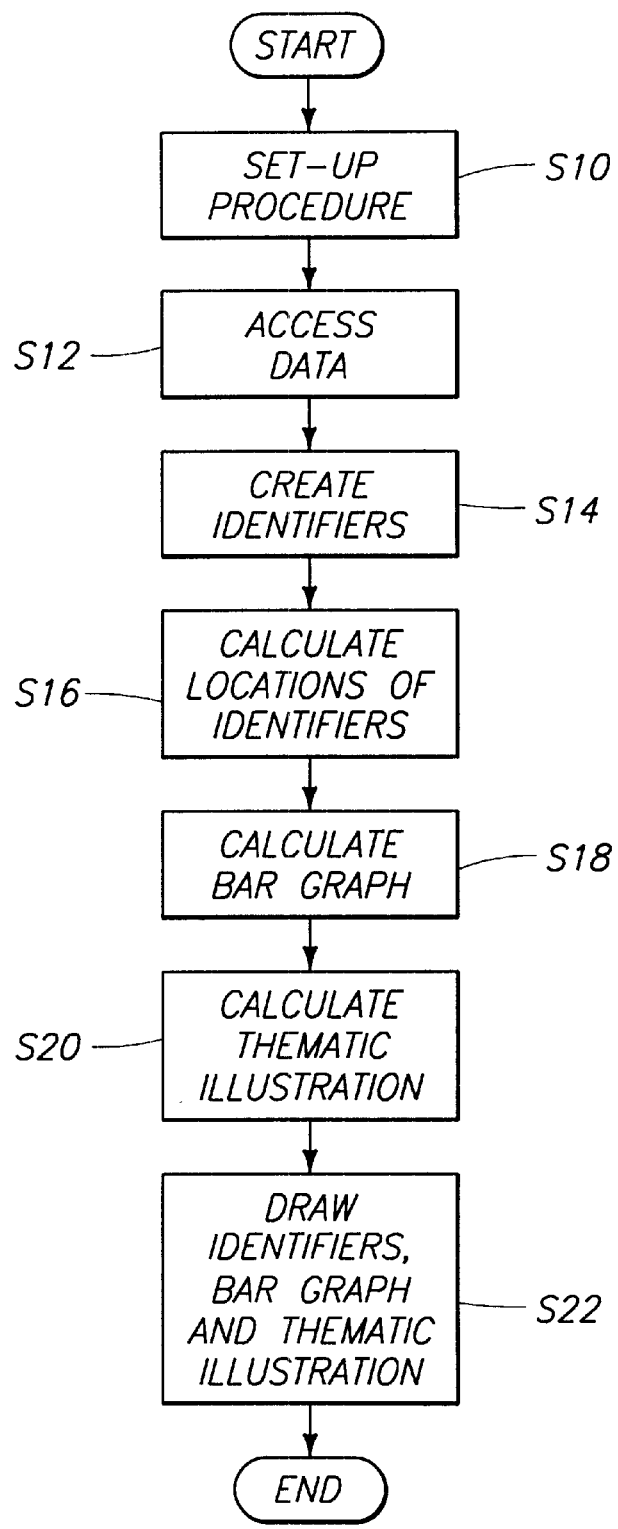
FIG. 7 is a flow chart illustrating an exemplary method to depict data in accordance with the present invention.
Figure 8:
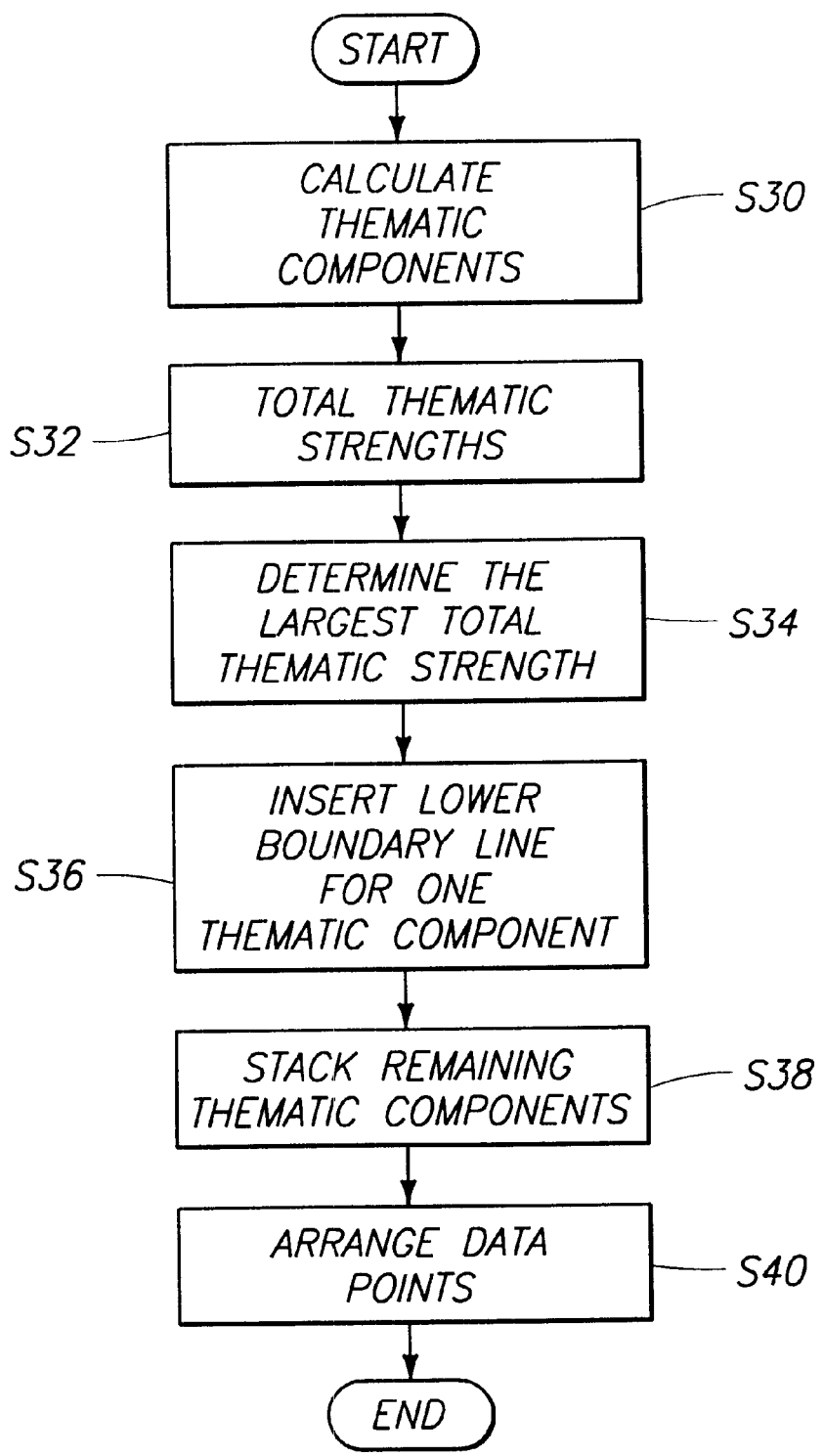
FIG. 8 is a flow chart illustrating an exemplary method to calculate a thematic illustration.
Figure 9:
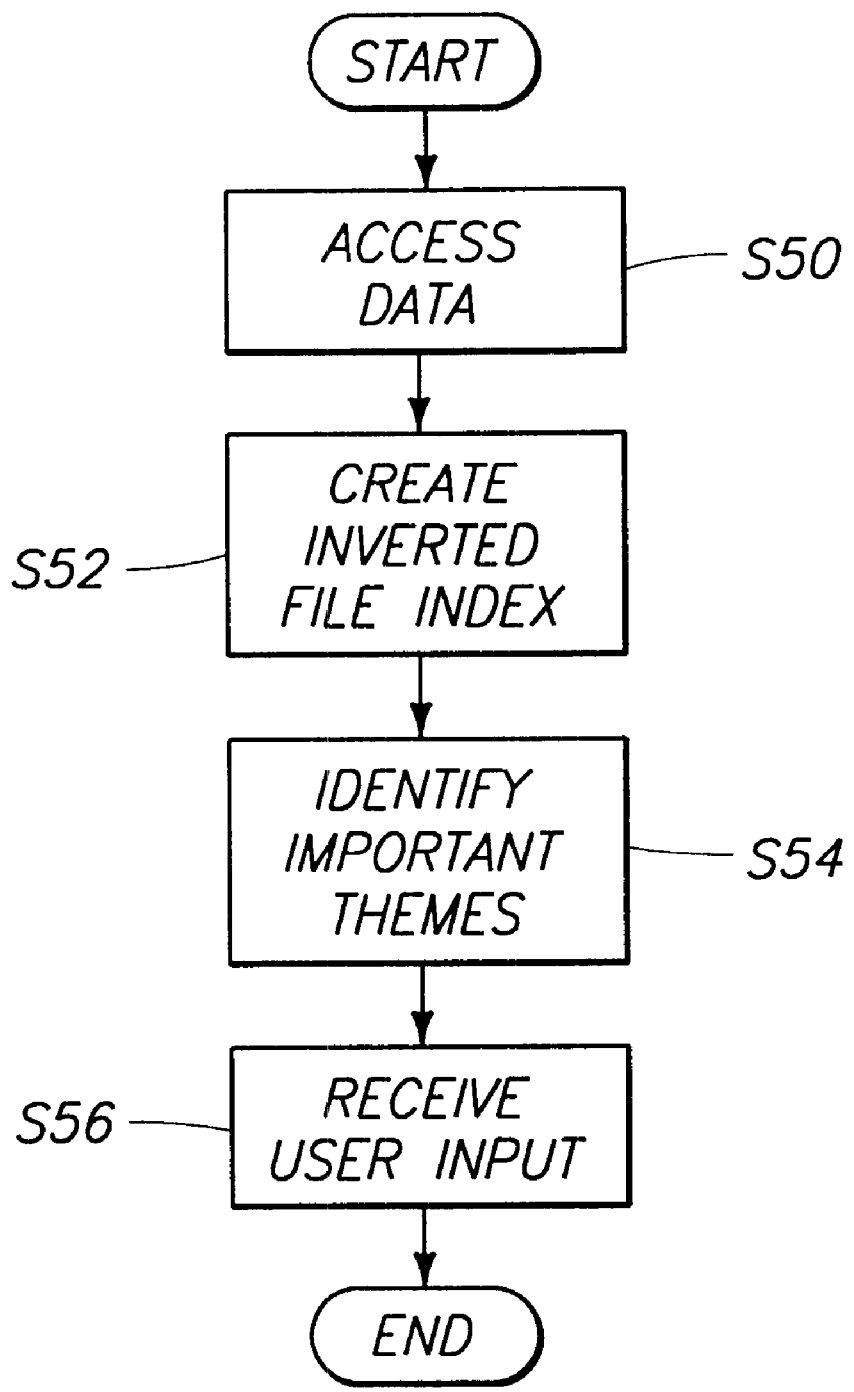
FIG. 9 is a flow chart illustrating an exemplary method to depict data from a given set of data corresponding to documents.

Referring to FIG. 7–FIG. 9, exemplary methods are shown for constructing visual representations in accordance with aspects of the present invention. The depicted methods may be implemented using processor 20 configured to execute computer usable or executable code stored within storage devices 22 or received via an external network within network interface 24. For example, computer usable code may be provided via a floppy disk, hard disk, zip disk, CD-ROM, etc., or alternatively embodied within a transmission medium, such as a carrier wave, and communicated via a network, such as the Internet. The depicted method is implemented in hardware in other configurations.

Referring specifically to FIG. 7, an exemplary method is illustrated to implement control of one or more image devices to depict thematic illustrations according to certain aspects of the present invention.

Initially, the processor proceeds to step S10 to execute a set-up procedure. For example, at step S10, the processor creates a window having a menu bar and/or a drawing area within the appropriate image device.

Next, the processor proceeds to step S12 to access data to be visually depicted as a thematic illustration by image device 12. Such data typically includes references, events, a plurality of themes, and a plurality of thematic strengths and identifiers corresponding to the themes. Alternatively, the processor is configured in some embodiments to determine thematic strength data from received theme and reference data.

At step S14, the processor creates a plurality of identifiers to be depicted relative to thematic illustration 18. For example, the processor creates the reference labels, event labels and theme labels described above.

At step S16, the processor calculates locations of identifiers. In one embodiment, the processor depicts time tics and grid positions corresponding to appropriate reference labels, event labels and theme labels.

The processor calculates a bar chart at step S18. According to one aspect, such includes calculating total thematic strength for themes illustrated in the thematic illustration and total thematic strength for themes not illustrated in the thematic illustration as described above.

At step S20, the processor calculates the thematic illustration using data accessed in step S12. An exemplary method for performing step S20 is described in detail with reference to FIG. 8 below.

At step S22, the processor draws the identifiers, bar chart and thematic illustration for depiction by image device 12.

The processor is configured in one embodiment to adjust control of the data visualization apparatus responsive to input from a user via the user interface, via the network interface, or other modes. For example, a user may request new data, new time or reference resolution, a curve type for the thematic components, a change in the order of the themes, etc. The processor is configured to re-execute appropriate portions of the depicted method responsive to such changes or requests from a user.

Referring to FIG. 8, an exemplary method for calculating the thematic illustration of step S20 described in FIG. 7 is depicted.

Initially, at step S30, the processor calculates thematic components comprising curves. Such exemplary thematic components comprising curves are depicted in FIG. 4 above.

Next, the processor totals the thematic strengths of all thematic components at respective references at step S32.

Thereafter, the processor determines a largest total thematic strength for a given portion of the thematic illustration at step S34. Such determines positioning and offsetting of the thematic illustration as described previously.

At step S36, the processor inserts a lower boundary line from one of the thematic components. Such determination of the lower boundary line is described above with reference to FIG. 5–FIG. 6 corresponding to the lower outer contour line 34.

At step S38, the processor stacks the remaining thematic components upon the thematic component having the lower boundary line upwardly to provide the uppermost boundary line corresponding to the uppermost outer contour line 34.

At step S40, the processor arranges data points for depiction within or by the appropriate image device.

Referring to FIG. 9, an exemplary method for displaying the occurrence of words (e.g., corresponding to themes) within speeches by Fidel Castro relative to moments in time (e.g., the references) is shown. Further details of the depicted method are described in detail in co-pending U.S. patent application Ser. No. 08/695,455, filed Aug. 12, 1996, entitled Three-Dimensional Display of Document Set, and co-pending U.S. patent application Ser. No. 08/713,313, filed Sep. 13, 1996, entitled System for Information Discovery, both of which are incorporated herein by reference.

Initially, the processor accesses an input data file at step S50 containing theme information and reference information.

At step S52, the processor creates an inverted file index from the received data. For example, the processor lists all words that appear in the documents of the received data and also the number of times the words appear in the documents with respect to references comprising given moments in time in the described method.

Thereafter, the processor identifies important themes from the inverted file index at step S54. Such identification of important themes is described in detail in the above-identified co-pending patent applications. The identification comprises filtering the inverted file index in one embodiment.

At step S56, the processor prompts a user to select important themes providing an interactive methodology. The user adjusts the number of themes to be displayed within thematic illustration 18 at step S56 using user interface 16. For example, the user reduces the number of themes to be depicted within the thematic illustration.

Thereafter, the processor determines respective thematic strengths for the themes chosen in step S56 using the inverted file index. The method of FIG. 8 is utilized to determine thematic strengths and to provide the thematic illustration. An exemplary method for calculating thematic strength of the themes includes analyzing the desired data to provide numerical values representing thematic strengths in one embodiment. For example, the number of times a theme is mentioned in documents for a given time reference is determined to provide thematic strength of the theme.

Figure 10:
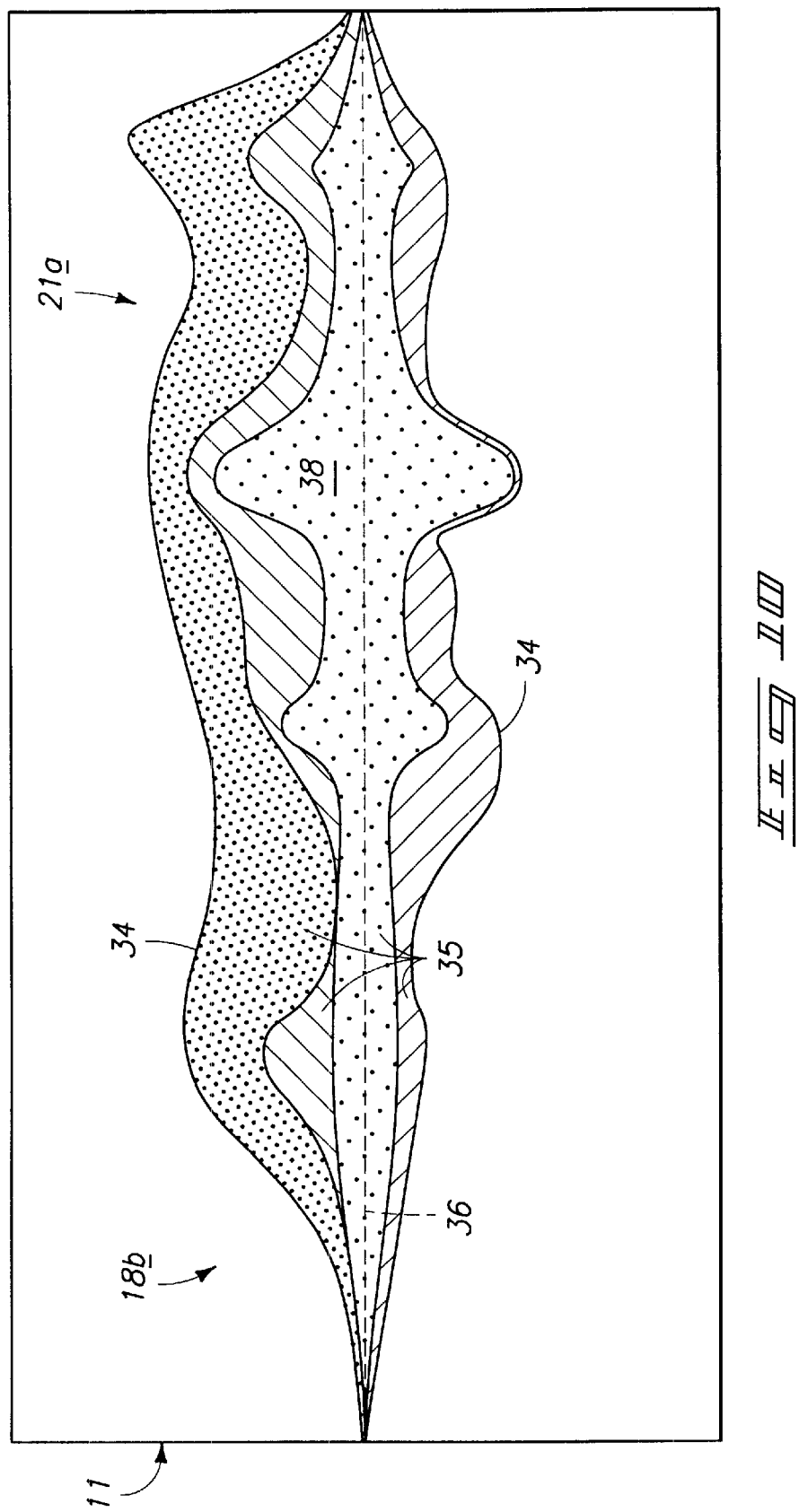
FIG. 10 is a graphical representation of another exemplary thematic illustration.

Referring to FIG. 10, another exemplary visual representation 21a including thematic illustration 18b is shown. Thematic illustration 18b includes a plurality of outer contour lines 34 and a plurality of thematic components 35 intermediate outer contour lines 34. A selected one thematic component 35, referred to as reference 38, is centered about reference line 36. As shown, centered thematic component 38 is symmetrical about reference line 36.

During the formulation of thematic illustration 18b, curves corresponding to thematic components 35 are calculated by processor 20 as described previously. Thereafter, one of the thematic components 35 is centered about reference line 36 to provide a centered thematic component 38. Remaining thematic components 35 are stacked by processor 20 relative to centered thematic component 38. In one embodiment, such remaining thematic components 35 are stacked above and below centered thematic component 38.

Alternatively, remaining thematic components 35 are provided adjacent one side of centered thematic component 38. In such a configuration, centered thematic component 38 defines at least one of outer contour lines 34.

The arrangement of thematic illustration 18b is advantageous to prominently display centered thematic component 38. According to one configuration, processor 20 selects centered thematic component 38 from remaining thematic components 35. Alternatively, a user can select centered component 38 from remaining thematic components 35 using user interface 16.

Referring to FIG. 11, yet another exemplary visual representation 21b is depicted including plural thematic illustrations 18, 18c. Thematic illustrations 18, 18c depict multiple streams of data relative to a common sequence (e.g., time shown in monthly periods) and common events. For example, thematic illustrations 18, 18c can represent speeches from two world leaders relative to common references and common events. Thematic illustrations 18, 18c are shown parallel and substantially separate. Alternatively, thematic illustrations 18, 18c merge and intermingle to portray reinforcement. Further, additional thematic illustrations (not shown) may be provided to portray additional information.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A data visualization apparatus comprising:
    an image device configured to provide a visual image; and
    digital processing circuitry coupled with the image device and configured to access data including a plurality of themes, to generate a thematic illustration corresponding to the themes and having a plurality of outer contour lines which are spaced at varying distances relative to a reference line, and to control the image device to depict the thematic illustration, wherein at least one of the outer contour lines is spaced at the varying distances relative to the reference line corresponding to strengths of plural ones of the themes.

2. The apparatus according to claim 1 wherein the digital processing circuitry is configured to define the outer contour lines corresponding to cumulative thematic strengths of the themes.

3. The apparatus according to claim 1 wherein the digital processing circuitry is configured to define the thematic illustration symmetrical about a center line.

4. The apparatus according to claim 1 wherein the digital processing circuitry is configured to control the image device to depict one of a bar chart and a histogram relative to the thematic illustration corresponding to respective thematic strengths of the themes.

5. The apparatus according to claim 1 wherein the digital processing circuitry is configured to control the image device to depict a plurality of identifiers relative to the thematic illustration identifying at least one of the themes, a plurality of references and a plurality of events.

6. The apparatus according to claim 1 wherein the data includes a plurality of references and the digital processing circuitry is configured to control the image device to depict the thematic strengths of the themes at the corresponding references.

7. The apparatus according to claim 6 wherein the digital processing circuitry is configured to control the image device to depict the references sequentially relative to the thematic illustration.

8. The apparatus according to claim 1 wherein the digital processing circuitry is configured to control the image device to depict a plurality of the thematic illustrations relative to one another.

9. The apparatus according to claim 1 wherein the digital processing circuitry is configured to control the image device to depict a plurality of thematic components intermediate the outer contour lines individually corresponding to a respective one of the themes.

10. The apparatus according to claim 9 wherein the digital processing circuitry is configured to center one of the thematic components within the thematic illustration and position the remaining thematic components relative to the centered thematic component.

11. The apparatus according to claim 9 wherein the digital processing circuitry is configured to control the image device to depict the thematic components individually contacting adjacent thematic components.

12. The apparatus according to claim 9 wherein the digital processing circuitry is configured to control the image device to depict the thematic components comprising curves.

13. The apparatus according to claim 9 wherein the digital processing circuitry is configured to control the image device to depict the thematic components having widths corresponding to respective thematic strengths of the themes.

14. The apparatus according to claim 9 wherein the digital processing circuitry is configured to control the image device to depict the thematic illustration comprising a solid illustration of the thematic components.

15. The apparatus according to claim 9 wherein the digital processing circuitry is configured to control the image device to depict the thematic components comprising a plurality of different respective colors.

16. The apparatus according to claim 1 wherein the digital processing circuitry is configured to generate a plurality of thematic components corresponding to respective ones of the themes and to stack and to orient the thematic components relative to a center of the thematic illustration.

17. The apparatus according to claim 16 wherein the processing circuitry is configured to position the reference line centered relative to a portion of the thematic illustration having the greatest cumulative thematic strengths of the thematic components.

18. The apparatus according to claim 1 wherein the digital processing circuitry is configured to generate a plurality of thematic components corresponding to respective ones of the themes, to center one of the thematic components within the thematic illustration, and to provide the other thematic components relative to the centered thematic component.

19. A computer-readable medium comprising:
computer usable code configured to cause digital processing circuitry to access data comprising a plurality of themes;
computer usable code configured to cause digital processing circuitry to generate a thematic illustration having a plurality of outer contour lines spaced at varying distances relative to a reference line corresponding to strengths of plural ones of the themes and a plurality of thematic components intermediate the outer contour lines which individually correspond to a respective one of the themes; and
computer usable code configured to cause digital processing circuitry to control an image device to depict the thematic illustration.

20. The medium according to claim 19 further comprising computer usable code configured to cause digital processing circuitry to define the outer contour lines corresponding to cumulative thematic strengths of the themes.

21. The medium according to claim 19 further comprising computer usable code configured to cause digital processing circuitry to define the thematic illustration as symmetrical about a center line.

22. The medium according to claim 19 further comprising computer usable code configured to cause digital processing circuitry to control the image device to depict a bar chart relative to the thematic illustration corresponding to respective thematic strengths of the themes.

23. The medium according to claim 19 further comprising computer usable code configured to cause digital processing circuitry to control the image device to provide a plurality of identifiers relative to the thematic illustration identifying at least one of the themes, a plurality of references and a plurality of events.

24. The medium according to claim 19 further comprising computer usable code configured to cause digital processing circuitry to control the image device to depict the thematic components individually contacting adjacent thematic components.

25. The medium according to claim 19 further comprising computer usable code configured to cause digital processing circuitry to control the image device to depict the thematic components having widths corresponding to respective thematic strengths of the themes.

26. The medium according to claim 19 further comprising computer usable code configured to cause digital processing circuitry to control the image device to depict the thematic illustration comprising a solid illustration of the thematic components.

27. The medium according to claim 19 further comprising computer usable code configured to cause digital processing circuitry to generate the thematic components, and to stack and to orient the thematic components relative to a center of the thematic illustration to generate the thematic illustration.

28. The medium according to claim 19 further comprising computer usable code configured to cause digital processing circuitry to position the reference line centered relative to a portion of the thematic illustration having the greatest cumulative thematic strengths of the thematic components.

29. A computer data signal embodied in a transmission medium comprising:
computer usable code configured to cause digital processing circuitry to access data comprising a plurality of themes;

computer usable code configured to cause digital processing circuitry to generate a thematic illustration having a plurality of outer contour lines spaced at varying distances relative to a reference line corresponding to strengths of plural ones of the themes and a plurality of thematic components intermediate the outer contour lines which individually correspond to a respective one of the themes; and computer usable code configured to cause digital processing circuitry to control an image device to depict the thematic illustration.

30. The signal according to claim 29 further comprising computer usable code configured to cause digital processing circuitry to define the outer contour lines corresponding to cumulative thematic strengths of the themes.

31. The signal according to claim 29 further comprising computer usable code configured to cause digital processing circuitry to control the image device to depict the thematic components having widths corresponding to respective thematic strengths of the themes.

32. The signal according to claim 29 further comprising computer usable code configured to cause digital processing circuitry to control the image device to depict the thematic illustration comprising a solid illustration of the thematic components.

33. A data visualization method comprising:

accessing data including a plurality of themes; and depicting a thematic illustration with respect to a reference line and corresponding to the themes and having a plurality of outer contour lines which define the thematic illustration and are individually spaced at varying distances relative to the reference line corresponding to strengths of plural ones of the themes.

34. The method according to claim 33 wherein the depicting comprises depicting the outer contour lines corresponding to cumulative thematic strengths of the themes.

35. The method according to claim 33 wherein the depicting comprises depicting symmetrical outer contour lines about a center line.

36. The method according to claim 33 further comprising depicting a bar chart relative to the thematic illustration corresponding to respective thematic strengths of the themes.

37. The method according to claim 33 further comprising depicting a plurality of identifiers relative to the thematic illustration to identify at least one of the themes, a plurality of references and a plurality of events.

38. The method according to claim 33 wherein the depicting comprises depicting a plurality of the thematic illustrations relative to one another.

39. The method according to claim 33 wherein the depicting comprises depicting a plurality of thematic components intermediate the outer contour lines individually corresponding to a respective one of the themes.

40. The method according to claim 39 wherein the depicting comprises:

centering one of the thematic components within the thematic illustration; and depicting the other thematic components relative to the centered thematic component.

41. The method according to claim 39 wherein the depicting comprises depicting the thematic components individually contacting adjacent thematic components.

42. The method according to claim 39 wherein the depicting comprises depicting thematic components comprising curves.

43. The method according to claim 39 wherein the depicting comprises depicting thematic components having widths corresponding to respective thematic strengths of the themes.

44. The method according to claim 39 wherein the depicting comprises depicting the thematic illustration comprising a solid illustration of the thematic components.

45. The method according to claim 39 wherein the depicting comprises depicting thematic components comprising a plurality of different respective colors.

46. The method according to claim 33 wherein the depicting comprises:

generating a plurality of thematic components for respective ones of the themes;

stacking the thematic components; and orientating the thematic components relative to a center of the thematic illustration.

47. The method according to claim 33 further comprising centering the reference line relative to a portion of the thematic illustration having the greatest cumulative thematic strengths of the thematic components.

48. The method according to claim 33 wherein the accessing comprises accessing data corresponding to the occurrence of textual information within a plurality of documents and the depicting comprises depicting usage of the textual information within the documents.

49. The method according to claim 33 wherein the accessing comprises:

filtering original data; and analyzing the data to determine thematic strengths.

50. A digital computer data visualization method comprising:

accessing data including a plurality of themes using digital processing circuitry;

generating a thematic illustration using the digital processing circuitry having a plurality of outer contour lines spaced at varying distances relative to a reference line corresponding to plural ones of the themes and a plurality of thematic components intermediate the outer contour lines which individually correspond to a respective one of the themes, wherein the generating comprises generating the thematic illustration comprising a solid illustration of the thematic components wherein adjacent thematic components contact one another; and depicting the thematic illustration.

51. The method according to claim 50 wherein the generating comprises generating the outer contour lines corresponding to cumulative thematic strengths of the themes.

52. The method according to claim 50 wherein the generating comprises generating symmetrical outer contour lines about a center line.

53. The method according to claim 50 further comprising depicting a bar chart relative to the thematic illustration corresponding to respective thematic strengths of the themes.

54. The method according to claim 50 further comprising depicting a plurality of identifiers relative to the thematic illustration identifying at least one of the themes, a plurality of references and a plurality of events.

55. The method according to claim 50 wherein the generating comprises generating the outer contour lines corresponding to strengths of plural ones of the themes.

56. The method according to claim 50 wherein the generating comprises generating thematic components comprising curves.

57. The method according to claim 50 wherein the generating comprises generating thematic components having widths corresponding to respective thematic strengths.

58. The method according to claim 50 wherein the generating comprises generating thematic components comprising a plurality of different respective colors.

59. The method according to claim 50 wherein the generating comprises:

generating the thematic components for respective ones of the themes;

stacking the thematic components; and orientating the thematic components relative to a center of the thematic illustration.

60. The method according to claim 59 further comprising centering the reference line relative to a portion of the thematic illustration having the greatest cumulative thematic strengths of the thematic components.

61. A digital computer data visualization method comprising:

accessing a plurality of references and theme data including a plurality of themes and a plurality of thematic strengths corresponding to the themes using digital processing circuitry;

generating a thematic illustration with respect to the references using the digital processing circuitry, the generating comprising:

generating a plurality of thematic components individually corresponding to respective ones of the themes and having widths individually corresponding to respective ones of the thematic strengths;

stacking the thematic components;

centering a reference line relative to a portion of the thematic illustration having the greatest cumulative thematic strengths of the thematic components; and orientating the thematic components relative to the reference line;

controlling an image device to depict the thematic illustration using the digital processing circuitry;

generating a bar chart relative to the reference line corresponding to respective thematic strengths of the themes using the digital processing circuitry;

controlling the image device to visually depict the bar chart using the digital processing circuitry; and controlling the image device to visually depict a plurality of identifiers relative to the thematic illustration to identify the references, the themes and a plurality of events using the digital processing circuitry.

62. The apparatus according to claim 1 wherein the at least one outer contour line is spaced at the varying distances relative to the reference line corresponding to the plural ones of the themes comprising thematic components having respective widths, and wherein at least one of the thematic components has a plurality of widths.

63. A data visualization apparatus comprising:

an image device configured to provide a visual image; and digital processing circuitry coupled with the image device and configured to access data including a plurality of themes, to generate a thematic illustration corresponding to the themes and having a plurality of outer contour lines which are spaced at varying distances relative to a reference line and include a plurality of thematic components between the outer contour lines providing a solid thematic illustration, and to control the image device to depict the thematic illustration, wherein the digital processing circuitry is configured to control the image device to depict one of a bar chart and a histogram relative to the thematic illustration corresponding to respective thematic strengths of the themes.

64. A data visualization apparatus comprising:

an image device configured to provide a visual image; and digital processing circuitry coupled with the image device and configured to access data including a plurality of themes, to generate a thematic illustration corresponding to the themes and having a plurality of outer contour lines which are spaced at varying distances relative to a reference line, and to control the image device to depict the thematic illustration, wherein the digital processing circuitry is configured to control the image device to depict a plurality of identifiers relative to the thematic illustration identifying at least one of the themes, a plurality of references and a plurality of events wherein the digital processing circuitry is further configured to depict a plurality of the thematic illustrations relative to one another.

65. A data visualization apparatus comprising:

an image device configured to provide a visual image; and digital processing circuitry coupled with the image device and configured to access data including a plurality of themes, to generate a thematic illustration corresponding to the themes and having a plurality of outer contour lines which are spaced at varying distances relative to a reference line, and to control the image device to depict the thematic illustration, wherein the digital processing circuitry is configured to control the image device to depict a plurality of the thematic illustrations relative to one another.

66. A data visualization apparatus comprising:

an image device configured to provide a visual image; and digital processing circuitry coupled with the image device and configured to access data including a plurality of themes, to generate a thematic illustration corresponding to the themes and having a plurality of outer contour lines which are spaced at varying distances relative to a reference line, and to control the image device to depict the thematic illustration, wherein the digital processing circuitry is configured to control the image device to depict a plurality of thematic components intermediate the outer contour lines individually corresponding to a respective one of the themes and the thematic components comprise a plurality of different colors.

67. The apparatus according to claim 66 wherein the digital processing circuitry is configured to center one of the thematic components within the thematic illustration and position the remaining thematic components relative to the centered thematic component.

68. The apparatus according to claim 66 wherein the digital processing circuitry is configured to control the image device to depict the thematic components individually contacting adjacent thematic components.

69. The apparatus according to claim 66 wherein the digital processing circuitry is configured to control the image device to depict the thematic components comprising curves.

70. The apparatus according to claim 66 wherein the digital processing circuitry is configured to control the image device to depict the thematic components having widths corresponding to respective thematic strengths of the themes.

71. The apparatus according to claim 66 wherein the digital processing circuitry is configured to control the image device to depict the thematic illustration comprising a solid illustration of the thematic components.

72. A data visualization apparatus comprising:

an image device configured to provide a visual image; and digital processing circuitry coupled with the image device and configured to access data including a plurality of themes, to generate a thematic illustration corresponding to the themes and having a plurality of outer contour lines which are spaced at varying distances relative to a reference line, and to control the image device to depict the thematic illustration, wherein the digital processing circuitry is configured to generate a plurality of thematic components corresponding to respective ones of the themes and to stack and to orient the thematic components relative to a center of the thematic illustration.

73. The apparatus according to claim 72 wherein the processing circuitry is configured to position the reference line centered relative to a portion of the thematic illustration having the greatest cumulative thematic strengths of the thematic components.

74. A data visualization apparatus comprising:

an image device configured to provide a visual image; and digital processing circuitry coupled with the image device and configured to access data including a plurality of themes, to generate a thematic illustration corresponding to the themes and having a plurality of outer contour lines which are spaced at varying distances relative to a reference line, and to control the image device to depict the thematic illustration, wherein the digital processing circuitry is configured to generate a plurality of thematic components corresponding to respective ones of the themes, to center one of the thematic components within the thematic illustration, and to provide the other thematic components relative to the centered thematic component.

75. A computer-readable medium comprising:

computer usable code configured to cause digital processing circuitry to access data comprising a plurality of themes;

computer usable code configured to cause digital processing circuitry to generate a thematic illustration having a plurality of outer contour lines spaced at varying distances relative to a reference line and a plurality of thematic components intermediate the outer contour lines which individually correspond to a respective one of the themes and to provide a solid thematic illustration intermediate the outer contour lines;

computer usable code configured to cause digital processing circuitry to control an image device to depict the thematic illustration; and computer usable code configured to cause digital processing circuitry to control the image device to provide a plurality of identifiers relative to the thematic illustration identifying at least one of the themes, a plurality of references and a plurality of events.

76. A computer-readable medium comprising:

computer usable code configured to cause digital processing circuitry to access data comprising a plurality of themes;

computer usable code configured to cause digital processing circuitry to generate a thematic illustration having a plurality of outer contour lines spaced at varying distances relative to a reference line and a plurality of thematic components intermediate the outer contour lines which individually correspond to a respective one of the themes;

computer usable code configured to cause digital processing circuitry to control an image device to depict the thematic illustration; and computer usable code configured to cause digital processing circuitry to control the image device to depict the thematic components individually contacting adjacent thematic components.

77. A computer-readable medium comprising:

computer usable code configured to cause digital processing circuitry to access data comprising a plurality of themes;

computer usable code configured to cause digital processing circuitry to generate a thematic illustration having a plurality of outer contour lines spaced at varying distances relative to a reference line and a plurality of thematic components intermediate the outer contour lines which individually correspond to a respective one of the themes and individually comprise a different color than other ones of the thematic components;

computer usable code configured to cause digital processing circuitry to control an image device to depict the thematic illustration; and computer usable code configured to cause digital processing circuitry to control the image device to depict the thematic components having widths corresponding to respective thematic strengths of the themes.

78. A computer-readable medium comprising:

computer usable code configured to cause digital processing circuitry to access data comprising a plurality of themes;

computer usable code configured to cause digital processing circuitry to generate a thematic illustration having a plurality of outer contour lines spaced at varying distances relative to a reference line and a plurality of thematic components intermediate the outer contour lines which individually correspond to a respective one of the themes;

computer usable code configured to cause digital processing circuitry to control an image device to depict the thematic illustration; and computer usable code configured to cause digital processing circuitry to control the image device to depict the thematic illustration comprising a solid illustration of the thematic components.

79. A computer-readable medium comprising:

computer usable code configured to cause digital processing circuitry to access data comprising a plurality of themes;

computer usable code configured to cause digital processing circuitry to generate a thematic illustration having a plurality of outer contour lines spaced at varying distances relative to a reference line and a plurality of thematic components intermediate the outer contour lines which individually correspond to a respective one of the themes;

computer usable code configured to cause digital processing circuitry to control an image device to depict the thematic illustration; and computer usable code configured to cause digital processing circuitry to generate the thematic components, and to stack and to orient the thematic components relative to a center of the thematic illustration to generate the thematic illustration.

80. A computer-readable medium comprising:
  computer usable code configured to cause digital processing circuitry to access data comprising a plurality of themes;
  computer usable code configured to cause digital processing circuitry to generate a thematic illustration having a plurality of outer contour lines spaced at varying distances relative to a reference line and a plurality of thematic components intermediate the outer contour lines which individually correspond to a respective one of the themes;
  computer usable code configured to cause digital processing circuitry to control an image device to depict the thematic illustration; and
  computer usable code configured to cause digital processing circuitry to position the reference line centered relative to a portion of the thematic illustration having the greatest cumulative thematic strengths of the thematic components.

81. A computer data signal embodied in a transmission medium comprising:
  computer usable code configured to cause digital processing circuitry to access data comprising a plurality of themes;
  computer usable code configured to cause digital processing circuitry to generate a thematic illustration having a plurality of outer contour lines spaced at varying distances relative to a reference line and a plurality of thematic components intermediate the outer contour lines which individually correspond to a respective one of the themes;
  computer usable code configured to cause digital processing circuitry to control an image device to depict the thematic illustration; and
  computer usable code configured to cause digital processing circuitry to control the image device to depict the thematic illustration comprising a solid illustration of the thematic components.

82. A data visualization method comprising:
  accessing data including a plurality of themes;
  depicting a solid thematic illustration with respect to a reference line and corresponding to the themes and having a plurality of outer contour lines which define the thematic illustration and are individually spaced at varying distances relative to the reference line; and
  depicting a plurality of identifiers relative to the thematic illustration to identify at least one of the themes, a plurality of references and a plurality of events.

83. A data visualization method comprising:
  accessing data including a plurality of themes; and
  depicting a thematic illustration with respect to a reference line and corresponding to the themes and having a plurality of outer contour lines which define the thematic illustration and are individually spaced at varying distances relative to the reference line, wherein the depicting comprises depicting a plurality of the thematic illustrations relative to one another.

84. A data visualization method comprising:
  accessing data including a plurality of themes;
  depicting a thematic illustration with respect to a reference line and corresponding to the themes and having a plurality of outer contour lines which define the thematic illustration and are individually spaced at varying distances relative to the reference line, wherein the depicting comprises depicting a plurality of thematic components intermediate the outer contour lines individually corresponding to a respective one of the themes; and
    wherein the depicting comprises depicting the thematic components individually contacting adjacent thematic components.

85. The method according to claim 84 wherein the depicting comprises:
  centering one of the thematic components within the thematic illustration; and
  depicting the other thematic components relative to the centered thematic component.

86. The method according to claim 84 wherein the depicting comprises depicting the thematic components individually contacting adjacent thematic components.

87. The method according to claim 84 wherein the depicting comprises depicting thematic components comprising curves.

88. The method according to claim 84 wherein the depicting comprises depicting thematic components having widths corresponding to respective thematic strengths of the themes.

89. The method according to claim 84 wherein the depicting comprises depicting the thematic illustration comprising a solid illustration of the thematic components.

90. The method according to claim 84 wherein the depicting comprises depicting thematic components comprising a plurality of different respective colors.

91. A data visualization method comprising:
  accessing data including a plurality of themes; and
  depicting a thematic illustration with respect to a reference line and corresponding to the themes and having a plurality of outer contour lines which define the thematic illustration and are individually spaced at varying distances relative to the reference line, wherein the depicting comprises:
    generating a plurality of thematic components for respective ones of the themes;
    stacking the thematic components; and
    orientating the thematic components relative to a center of the thematic illustration.

92. A data visualization method comprising:
  accessing data including a plurality of themes;
  depicting a thematic illustration with respect to a reference line and corresponding to the themes and having a plurality of outer contour lines which define the thematic illustration and are individually spaced at varying distances relative to the reference line; and
  centering the reference line relative to a portion of the thematic illustration having the greatest cumulative thematic strengths of the thematic components.

93. A data visualization method comprising:
  accessing data including a plurality of themes;
  depicting a thematic illustration with respect to a reference line and corresponding to the themes and having a plurality of outer contour lines which define the thematic illustration and are individually spaced at varying distances relative to the reference line, wherein the accessing comprises accessing data corresponding to the occurrence of textual information within a plurality of documents and the depicting comprises depicting usage of the textual information within the documents.

94. A data visualization method comprising:
  accessing data including a plurality of themes, wherein the accessing comprises:

filtering original data; and analyzing the data to determine thematic strengths; and depicting a thematic illustration with respect to a reference line and corresponding to the themes and having a plurality of outer contour lines which define the thematic illustration and are individually spaced at varying distances relative to the reference line.

95. A digital computer data visualization method comprising:

accessing data including a plurality of themes using digital processing circuitry;

generating a thematic illustration using the digital processing circuitry having a plurality of outer contour lines spaced at varying distances relative to a reference line corresponding to strengths of the plurality of themes and a plurality of thematic components intermediate the outer contour lines which individually correspond to a respective one of the themes; and depicting the thematic illustration.

96. A digital computer data visualization method comprising:

accessing data including a plurality of themes using digital processing circuitry;

generating a thematic illustration using the digital processing circuitry having a plurality of outer contour lines spaced at varying distances relative to a reference line and a plurality of thematic components intermediate the outer contour lines which individually correspond to a respective one of the themes, wherein the generating comprises generating the thematic components individually contacting adjacent thematic components; and depicting the thematic illustration.

97. A digital computer data visualization method comprising:

accessing data including a plurality of themes using digital processing circuitry;

generating a thematic illustration using the digital processing circuitry having a plurality of outer contour lines spaced at varying distances relative to a reference line and a plurality of thematic components intermediate the outer contour lines which individually correspond to a respective one of the themes, wherein the generating comprises generating thematic components to contact one another along substantially an entirety of the thematic illustration and having widths corresponding to respective thematic strengths; and depicting the thematic illustration.

98. A digital computer data visualization method comprising:

accessing data including a plurality of themes using digital processing circuitry;

generating a thematic illustration using the digital processing circuitry having a plurality of outer contour lines spaced at varying distances relative to a reference line and a plurality of thematic components intermediate the outer contour lines which individually correspond to a respective one of the themes, wherein the generating comprises generating the thematic illustration comprising a solid illustration of the thematic components; and depicting the thematic illustration.

99. A digital computer data visualization method comprising:

accessing data including a plurality of themes using digital processing circuitry;

generating a thematic illustration using the digital processing circuitry having a plurality of outer contour lines spaced at varying distances relative to a reference line and a plurality of thematic components intermediate the outer contour lines which individually correspond to a respective one of the themes, wherein the generating comprises generating thematic components comprising a plurality of different respective colors; and depicting the thematic illustration.

100. A digital computer data visualization method comprising:

accessing data including a plurality of themes using digital processing circuitry;

generating a thematic illustration using the digital processing circuitry having a plurality of outer contour lines spaced at varying distances relative to a reference line and a plurality of thematic components intermediate the outer contour lines which individually correspond to a respective one of the themes, wherein the generating comprises:

generating the thematic components for respective ones of the themes;

stacking the thematic components; and orientating the thematic components relative to a center of the thematic illustration; and depicting the thematic illustration.

101. The method according to claim 100 further comprising centering the reference line relative to a portion of the thematic illustration having the greatest cumulative thematic strengths of the thematic components.

* * * * *